United States Patent Office 3,373,191
Patented Mar. 12, 1968

3,373,191
N-ARYLTHIOCARBAMOYLAMIC ACIDS
Asher A. Hyatt, Lexington, Mass., assignor to Monsanto Research Corporation, St. Louis, Mo., a corporation of Delaware
No Drawing. Filed July 9, 1965, Ser. No. 470,929
6 Claims. (Cl. 260—516)

This invention relates to new chemical compounds, and more particularly, to novel products of the reaction of aryl thioureas with acid anhydrides.

It is an object of this invention to provide new carbamic acid derivatives.

It is another object of this invention to provide new compounds useful as herbicides.

It is still another object of this invention to provide new compounds useful as mammalian toxicants.

These and other objects will become apparent as a detailed description of the invention proceeds.

According to the invention, there are prepared new and useful compounds which are the product of the reaction of an aromatic hydrocarbon substituted 2-thiourea and a dicarboxylic acid anhydride, said reaction product having the formula:

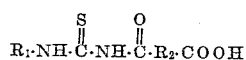

wherein $R_1$ is an aromatic hydrocarbon radical having up to 12 carbon atoms, and $R_2$ is an aliphatic hydrocarbon radical containing up to 6 carbon atoms.

There are shown below a number of the specific new compounds of this invention. It is not intended that this be a complete listing of all the compounds of the invention but that is merely be illustrative thereof: N-phenylthiocarbamoylsuccinamic acid, N-[(2,4-diethylbenzyl)thiocarbamoyl]carbamoylpropiolic acid, N-benzylthiocarbamoyl - 2 - methylmalonamic acid, N-phenylthiocarbamoylmaleamic acid, N-(2-ethylbenzyl)thiocarbamoylglutinamic acid, N-naphthylthiocarbamoylmaleamic acid, 5-(N - phenylthiocarbamoylcarbamoyl) - 3 - pentynoic acid, N-tolylthiocarbamoylmalonamic acid, N-benzylthiocarbamoyl-2-(2-propynyl)malonamic acid, N-xylylthiocarbamoylglutaconamic acid, N-tolythiocarbamoyl-2-ethylnylmalonamic acid, N-phenylthiocarbamoyl-2-methylsuccinamic acid, N-benzylthiocarbamoyladipamic acid, N-xylylthiocarbamoyl-2-ethylnylsuccinamic acid, N-(2-ethylbenzyl)thiocarbamoyl-2-ethynylmalonamic acid, N-(2,4-diethylbenzyl)thiocarbamoyl - 2 - ethylidenesuccinamic acid, N-(2-methyl-3-propylbenzyl)thiocarbamoylpyrocinchonamic acid, N-(2-ethylnaphthyl)thiocarbamoylcitraconamic acid, N-(5-ethyl-o-xylyl)thiocarbamoylitaconamic acid, N-phenylthiocarbamoyl-2-ethylidenemalonamic acid, N-xylylthiocarbamoyl-2-allylmalonamic acid, N - benzylthiocarbamoyl-2-propylidenemalonamic acid, and so forth.

An examination of the above listed compounds indicates that not every one of the possible novel compounds of the invention is named specifically. Nevertheless, it is intended to cover all compounds covered by the general formula but not specifically named.

Preparation of the presently provided novel compounds is effected by reaction of an arylthiourea with an acid anhydride, as illustrated by the equation

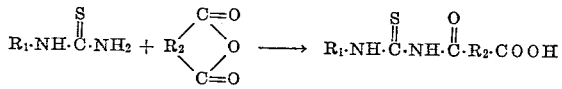

where $R_1$ and $R_2$ are as defined above.

In preparing compounds of this invention, aryl-substituted thioureas which may be used are, for example: 1-phenyl-2-thiourea, 1-(2- ethylbenzyl)-2-thiourea, 1-benzyl-2-thiourea, 1-(2,4-diethylbenzyl)-2-thiourea, 1-naphthyl-2-thiourea, 1 - (2-methyl-3-propylbenzyl)-2-thiourea, 1-tolyl-2-thiourea, 1-xylyl-2-thiourea, 1,5-ethyl-o-xylyl)-2-thiourea, 1-(2-ethylnaphthyl)-2-thiourea, 1-(3-propyl-o-tolyl) - 2 - thiourea, 1,(1,2 - dimethylnaphthyl)-2-thiourea, and so forth.

Useful acid anhydrides are, for example: succinic anhydride, acetylenedioic anhydride, methylmalonic anhydre, glutinic anhydride, maleic anhydred 3-hexynedioic anhydride, malonic anhydride, 2-(2-propynyl)malonic anhydride, glutaconic anhydride, 2-ethynylmalonic anhydride, 2-methylsuccinic anhydride, 2-ethynylsuccinic anhydride, adipic anhydride, glutaric anhydride 2-methylglutaric anhydride, 2,2-dimethylsuccinic anhydride, 2,3-dimethylsuccinic anhydride, citraconic anhydride, pyrocinchonic anhydride, itaconic anhydride, 2-ethynylmaleic anhydride, 2 - ethylidenemalonic anhydride, 2-ethylidenesuccinic anhydride, 2-allylmalonic anhydride, 2-propylidenemalonic anhydride, and so forth.

The new compounds of this invention may be prepared by contacting the dicarboxylic acid anhydride with the substituted thiourea compound until reaction is complete. It is an advantage in moderating the reaction to add one of the reactants slowly and gradually to the other, though the reactants may be mixed all at once, together with a solvent or diluent is desired.

Solvents or diluents which may be used to moderate the reaction and/or to facilitate stirring the mixture, and so forth, are for example, saturated aliphatic acids, such as formic, acetic, propionic, butyric, and isobutyric acids. The exact ratio of the reactants is not critical. Molar ratios of the reactants may vary from 1:10 to 10:1 if desired, but, since the reaction takes place by condensation of one mole of the anhydride with one mole of the thiourea, advantageously a 1:1 ratio of reactants is employed. However, if desired, an excess of the more readily available component may be used, to assure complete reaction. Excess reactant can then be removed at the end of the reaction by, for example, extraction or distillation.

Useful temperatures are, for example, the reflux temperature of the reaction mixture, where solvents are employed, or from any desired temperature from about ambient temperature to below the decomposition point of the ingredients of the reaction mixture. However, a reaction temperature of 25° to 100° C. is preferred to obtain the highest yield.

No catalyst is needed. It is usually required that the reaction take place in an anhydrous medium, for a few percent of water in the solvent may completely inhibit the reaction.

Atmospheric pressure is satisfactory for conducting the reaction, though sub- or super-atmospheric pressures may be used if desired, ranging from 0.05 millimeter of mercury to about 5,000 pounds per square inch.

Time is not critical; in general, it will depend on the nature of the reactants used and on the temperature of the reaction. Ordinarily reaction time will vary from less than one minute to several hours.

The isolation of the product may be accomplished by any general standard procedure, such as distillation, extraction or crystallization, for example.

The present new compounds are generally stable, well defined products, soluble in ketones, such as methyl ethyl ketone, acetone, and dimethyl ketone, for example.

The new carbamic acid derivatives provided by this invention possess a biological toxicant property hitherto unknown to this class of compounds, as demonstrated by testing N-phenylcarbamoylmaleamic acid, a known related compound, under the same conditions as the compounds described in this invention. Compounds as provided by this invention display biological toxicant activity against both plant and mammalian species.

This invention will be further described with reference to the following specific examples. These examples are given for purposes of illustration only and are not to be taken as in any way restricting the invention.

EXAMPLE 1

This example illustrates the preparation of compounds in accordance with this invention.

To a reaction flask containing 49 grams (g.) (0.05 mole) of maleic anhydride in 200 milliliters (ml.) of glacial acetic acid is added 76 g. (0.05 mole) of 1-phenyl-2-thiourea. The temperature of the reaction mixture is maintained at from 55° to 60° C. for two hours, during which time a white crystalline solid is formed. The temperature is then lowered to 20° C. and the contents of the flask are filtered. The white residue is washed several times with water and placed in a vacuum oven to dry. The resultant solid is N-phenylthiocarbamoylmaleamic acid, a uniformly white crystalline product weighing 9.3 g. (74.4% theoretical yield), and melting at 204–211° C.

Elemental analysis of this product confirms the assigned structure, $C_{11}H_{10}N_2O_3S$.

| Element | Percent Calculated | Percent Found |
|---|---|---|
| C | 52.8 | 52.6 |
| H | 4.0 | 4.0 |
| S | 12.8 | 13.1 |

EXAMPLE 2

This example illustrates the use of a compound of the present invention as a mammalian toxicant.

The phenyl compound provided as described in Example 1 is placed in solution by dissolving 100 milligram (mg.) of the compound in 10 ml. of an aqueous solution containing 10% of a polyethylene glycol having a molecular weight of 300. This solution is diluted with water to provide solutions which are injected into mice intravenously. At 31.6 milligrams/kilogram (mg./kg.) (3.16 ml./kg.), the animals exhibit lachrimation and decreased activity. The ratio of median lethal dose to median effective dose ($LD_{50}/MED_{50}$) is 17.8.

By contrast, similar administration of an N-substituted maleamic acid differing only in that the S atom is replaced by an O atom, N-phenylcarbamoylmaleamic acid, produced no effect on the test animals.

EXAMPLE 3

This example illustrates the use of a compound of this invention for the control of plant species.

Aluminum pan flats are filled with mixtures of two-thirds one-quarter mesh sieved soil, and one-third sand. Over one-third of the soil surface of each pan are scattered 20 seeds each of different kinds of grasses; seeds of broad-leaf plants are randomly scattered over the remaining surface. The seeds are then covered with soil to the pan top and the pan is sprayed with an aqueous solution of fertilizer and insecticide. The surfaces of the boxes are next sprayed with 30 ml. of an acetone solution of the phenyl compound provided as described in Example 1, at a rate equal to 25 pounds per acre of the chemical. Then the pans are placed in water and allowed to absorb moisture until the soil surface is completely moist, after which they are held in a greenhouse under standard conditions of moisture and sunlight. After ten days, the number and species of plants which have germinated and grown are observed.

The results of the test indicate that the product of Example 1 caused substantially complete suppression of plant germination and growth on pigweed, while it has no effect on sugar beets and tomato plants.

By contrast N-phenylcarbamoylmaleamic acid, a known related compounds, tested in the same manner, produces no effect on pigweed.

The new compounds of this invention are generally applied for herbicidal and toxicant use in the form of sprays or aerosols. Useful sprays may be prepared by dispersing the present products in water with the aid of a wetting agent, to prepare aqueous dispersions. For example, a polyalkylene glycol ether long chain alkyl benzene sulfonate wetting agent may be used to prepare such dispersions or emulsions. The products may also be applied as oil-in-water emulsion sprays. The present products may also be dissolved or dispersed in liquified gases such as fluorochloroethanes or methyl chloride and applied to plants or other pest organism hosts from aerosol bombs. Instead of employing liquids as carriers and diluents, herbicidal dusts which contain the present novel compounds as active ingredients may be prepared, for example, by incorporating the new products of this invention with a solid carrier such as talc, bentonite, fuller's earth, and so forth.

The amount of the active toxicant compound in the composition as applied will vary with the active ingredients, the manner of application, the species to be destroyed and the resistance of the plants to be sprayed, for example, and the formulation and ration of applications are suitably adjusted in accordance with these factors.

It is apparent that this invention may be extended to areas beyond those specifically described and that many widely differing embodiments can be made without departing from the spirit and scope thereof as defined herein. Therefore, it is not intended to be limited except as indicated by the appended claims.

What is claimed is:

1. New compounds of the formula

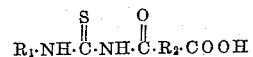

where $R_1$ is an aromatic hydrocarbon radical containing up to 12 carbon atoms and $R_2$ is an aliphatic hydrocarbon radical of up to 6 carbon atoms.

2. The compounds of claim 1 in which $R_2$ contains aliphatic unsaturation.

3. The compounds of claim 2 in which $R_2$ is an olefinic unsaturated aliphatic hydrocarbon radical of up to 6 carbon atoms.

4. The compounds of claim 1 in which $R_1$ is a phenyl radical.

5. The compounds of claim 2 in which $R_2$ is a vinylene radical.

6. N-phenylthiocarbamoylmaleamic acid.

References Cited

UNITED STATES PATENTS 3,121,111   2/1964   Berger et al. _____ 260—516

LORRAINE A. WEINBERGER, *Primary Examiner.*

M. G. BERGER, *Assistant Examiner.*